United States Patent
Zhang et al.

(10) Patent No.: US 8,356,052 B2
(45) Date of Patent: Jan. 15, 2013

(54) ANALYSIS OF THIRD PARTY NETWORKS

(75) Inventors: Tao Zhang, Centreville, VA (US);
Steven Kirk Donoho, Chantilly, VA (US)

(73) Assignee: Mantas, Inc., Herndon, VA (US)

( * ) Notice: Subject to any disclaimer, the term of this patent is extended or adjusted under 35 U.S.C. 154(b) by 0 days.

(21) Appl. No.: 13/420,864

(22) Filed: Mar. 15, 2012

(65) Prior Publication Data

US 2012/0173723 A1 Jul. 5, 2012

Related U.S. Application Data

(62) Division of application No. 12/777,988, filed on May 11, 2010, now Pat. No. 8,161,062, which is a division of application No. 10/341,073, filed on Jan. 13, 2003, now Pat. No. 7,716,165.

(51) Int. Cl.
*G06F 7/00* (2006.01)
*G06F 17/30* (2006.01)
*G06Q 40/00* (2012.01)
*G06F 15/16* (2006.01)

(52) U.S. Cl. ........ 707/776; 707/760; 707/780; 707/800; 707/950; 705/35; 709/203; 709/217; 709/218

(58) Field of Classification Search ............... 705/1, 1.1, 705/36, 36 R, 35, 44; 707/760, 776, 780, 707/800, 950; 709/203, 217, 218
See application file for complete search history.

(56) References Cited

U.S. PATENT DOCUMENTS

| | | | |
|---|---|---|---|
| 5,794,206 A | 8/1998 | Wilkinson et al. | |
| 5,819,226 A * | 10/1998 | Gopinathan et al. | 705/44 |
| 5,825,881 A | 10/1998 | Colvin, Sr. | |
| 5,956,717 A | 9/1999 | Kraay et al. | |
| 6,018,723 A * | 1/2000 | Siegel et al. | 705/38 |
| 6,049,861 A | 4/2000 | Bird et al. | |
| 6,094,643 A | 7/2000 | Anderson et al. | |
| 6,226,623 B1 | 5/2001 | Schein et al. | |
| 6,334,110 B1 | 12/2001 | Walter et al. | |
| 6,523,041 B1 | 2/2003 | Morgan et al. | |
| 6,606,605 B1 * | 8/2003 | Kolls | 705/26.35 |
| 6,643,635 B2 | 11/2003 | Nwabueze | |
| 6,704,039 B2 | 3/2004 | Pena | |

(Continued)

FOREIGN PATENT DOCUMENTS

EP 1020824 A2 * 7/2000

(Continued)

OTHER PUBLICATIONS

Henry G. Goldberg and Raphael W. H. Wong; Restructuring Transactional Data for Link Analysis in the FinCEN AI System; AAAI Technical Report FS-98-01; 1998; pp. 38-46.*

(Continued)

*Primary Examiner* — Ella Colbert
(74) *Attorney, Agent, or Firm* — Kilpatrick Townsend & Stockton LLP

(57) ABSTRACT

A method of analyzing customer behavior, where customers are engaged in customer-to-customer transactions in a third-party network, includes a transformation of data representing the customer-to-customer transactions from a data representation to a network representation, and then analyzing the network representation. The network representation includes a set of nodes and a set of links where each node represents a customer and each link represents a transaction between two of the customers.

20 Claims, 9 Drawing Sheets

U.S. PATENT DOCUMENTS

| | | | |
|---|---|---|---|
| 6,714,931 | B1 | 3/2004 | Papierniak et al. |
| 6,751,607 | B2 | 6/2004 | Kraay et al. |
| 6,766,327 | B2 * | 7/2004 | Morgan et al. ............ 1/1 |
| 7,272,626 | B2 | 9/2007 | Sahai et al. |
| 7,426,492 | B1 | 9/2008 | Bishop et al. |
| 7,716,165 | B2 * | 5/2010 | Zhang et al. .......... 705/7.29 |
| 8,161,062 | B2 * | 4/2012 | Zhang et al. .......... 707/760 |
| 2001/0034720 | A1 | 10/2001 | Armes |
| 2002/0091580 | A1 * | 7/2002 | Wang ................ 705/26 |
| 2003/0028484 | A1 * | 2/2003 | Boylan et al. ........... 705/40 |
| 2003/0084053 | A1 | 5/2003 | Govrin et al. |
| 2003/0093414 | A1 * | 5/2003 | Litzow et al. ............ 707/3 |
| 2003/0233319 | A1 | 12/2003 | Lawrence |
| 2004/0138978 | A1 | 7/2004 | Zhang et al. |
| 2004/0193532 | A1 | 9/2004 | Lawrence |
| 2007/0198406 | A1 | 8/2007 | Bishop et al. |
| 2010/0223199 | A1 | 9/2010 | Zhang et al. |

FOREIGN PATENT DOCUMENTS

WO            01/61541 A2     8/2001

OTHER PUBLICATIONS

Matei Ripeanu, Adriana Iamnitchi, and Ian Foster; "Mapping the Gnutella Network"; IEEE Internet Computing; Jan.-Feb. 2002; pp. 50-57.*

Anil K. Jain, Robert P. W. Duin, and Jianchang Mao; "Statistical Pattern Recognition: A Review"; IEE Transactions on pattern analysis and machine intelligence, vol. 22, No. 1; Jan. 2000; pp. 1-34.*

Author Unknown, "Hewlett Packard CO 3: HP Delivers Netmetrix 4.5: Powerful Tools for Testing Today's Internetworks; Application Suite Addresses Scaleability for Monitoring and Managing Large Networks," Business Wire, Mar. 20, 1995, [retrieved on Dec. 10, 2009], 3 pages. Retrieved from: https:www.dialogclassic.com/mainframe.html.

Author Unknown, "Fraud and Money Laundering Detection for Banks," Mantas, Inc., 2001 [retrieved on Dec. 3, 2001], 2 pages. Retrieved from: http://www.mantas.com.website/solutions/fraud_ml_banks.html.

Author Unknown, "Fraud and Money Laundering Detection for Securities Firms," Mantas, Inc., 2001 [retrieved on Dec. 3, 2001], 2 pages. Retrieved from: http://www.mantas.com.website/solutions/fraud_ml_sec_firms.html.

Author Unknown, "Mantas Best Execution," Mantas, Inc., 2001 [retrieved on Dec. 3, 2001], 2 pages. Retrieved from: http://www.mantas.com.website/solutions/best_execut.html.

Author Unknown, "Products," Mantas, Inc., 2001 [retrieved on Dec. 3, 2001], 2 pages. Retrieved from: http://www.mantas.com.website/solutions/solutions_products.html.

Author Unknown, "The Mantas Advantage," Mantas, Inc., 2001 [retrieved on Dec. 3, 2001], 1 page. Retrieved from: http://www.mantas.com.website/solutions/solutions_advantage.html.

Author Unknown, "The Mantas Equities Trading Compliance," Mantas, Inc., 2001 [retrieved on Dec. 3, 2001], 2 pages. Retrieved from: http://www.mantas.com.website/solutions/equ_trd_comp.html.

Author Unknown "What is Knowledge Discovery?," Mantas, Inc., 2001 [retrieved on Dec. 3, 2001], 1 page. Retrieved from: http://www.mantas.com.website/solutions/solutions_whatis.html.

Byramji, H., "New product offers real-time technical analysis charting," Wall Street Computer Review, Mar. 1987, vol. 4, No. 6; Abstract, 1 page.

Bolton, R., et al., "Statistical Fraud Detection: A Review,"Statistical Science, 2002, vol. 17, No. 3., pp. 235-255.

Goldberg, H., et al., "Break Detection Systems," AAAI Technical Report WS-97-07, 1997, 7 pages.

Goldberg, H., et al., "The FinCEN AI System: Finding Financial Crimes in a Large Database of Cash Transactions," *Agent Technology; Foundations, Applications, and Market*, (Ed. Jennings, et al.), 1998, Springer-Verlag New York, Inc., 21 pages.

Goldberg, H., et al., "Restructuring Databases for Knowledge Discovery by Consolidation and Link Formation," AAAI Technical Report FS-98-01, 1998, 6 pages.

Johnson, G., "Sifting Hidden Market Patterns for Profit," New York Times, Sep. 11, 1995, 4 pages.

Nash, N., "Strategies for the Sophisticated," New York Times, Nov. 20, 1983, 4 pages.

Schmerken, I., "Technical charting lights up securities trading," Wall Street Computer Review, Jun. 1989, vol. 6., No. 9; Abstract, 1 page.

Tanigawa, T., et al., "Stock price pattern matching system-dynamic programming neural networks approach," IJCNN International Joint Conference on Neural Networks, Jun. 1992, vol. 2; Abstract, 1 page.

Toigo, J., "The next move in enterprise management," Cardinal Business Media, Inc., 1997, [retrieved on Dec. 10, 2009], 5 pages. Retrieved from: https://www.dialogclassic.com/mainframe.html.

U.S. Appl. No. 10/341,073, filed Jan. 13, 2003, Office Action mailed Sep. 20, 2005, 6 pages.

U.S. Appl. No. 10/341,073, filed Jan. 13, 2003, Office Action mailed Aug. 28, 2006, 7 pages.

U.S. Appl. No. 10/341,073, filed Jan. 13, 2003, Office Action mailed Apr. 17, 2007, 8 pages.

U.S. Appl. No. 10/341,073, filed Jan. 13, 2003, Office Action mailed Nov. 27, 2007, 10 pages.

U.S. Appl. No. 10/341,073, filed Jan. 13, 2003, Final Office Action mailed Jan. 26, 2009, 14 pages.

U.S. Appl. No. 10/341,073, filed Jan. 13, 2003, Office Action mailed May 27, 2009, 14 pages.

U.S. Appl. No. 10/341,073, filed Jan. 13, 2003, Notice of Allowance mailed Feb. 18, 2010, 9 pages.

U.S. Appl. No. 12/777,988, filed May 11, 2010, Office Action mailed Jul. 20, 2011, 7 pages.

U.S. Appl. No. 12/777,988, filed May 11, 2010, Notice of Allowance mailed Dec. 15, 2011, 5 pages.

* cited by examiner

ANALYSIS OF THIRD PARTY NETWORKS

CROSS-REFERENCES TO RELATED APPLICATIONS

The present application is a divisional of U.S. patent application Ser. No. 12/777,988, filed May 11, 2010, entitled "ANALYSIS OF THIRD PARTY NETWORKS," which is a divisional of U.S. patent application Ser. No. 10/341,073, filed Jan. 13, 2003, entitled "ANALYSIS OF THIRD PARTY NETWORKS", now U.S. Pat. No. 7,716,165, the disclosures of each of which are herein incorporated by reference for all purposes.

FIELD OF THE INVENTION

This invention relates generally to the field of data mining, or more specifically methods and systems for analyzing properties or behaviors of business transactions. In particular, the invention relates to a method and system for analyzing groups behaviors, characteristics, and/or patterns associated with customer-to-customer business transactions in a network, such as a financial network.

BACKGROUND OF THE INVENTION

In financial industries such as the banking industry or the brokerage industry, a bank or broker provides business opportunities to its customers. In banking, the main business includes financial transactions between the bank as a banking business provider and its customers. However, there may be financial transactions conducted between customers themselves. These customer-to-customer (C2C) transactions may be called third party business activities because the provider bank is not financially involved in such activities. A group of customers connected through C2C business activities may be called a third party network. Better methods of understanding C2C transactions in groups and third party networks could help financial institutions identify new business opportunities and solve C2C business problems due to illegal group activities, such as money laundering activities and other group related frauds.

One approach to solve such financial problems in a database is data mining. There are two conventional approaches to study or understand transactions using data mining. One is an individual approach, in which each transaction and each customer are analyzed, and patterns associated with individual customers may be found. However, this approach does not provide any analysis of group patterns. Another approach is a group approach such as link analysis. Link analysis is a visual data-mining algorithm that helps to visualize connections between entities linked through transactions or other types of business activities. In comparison with the individual approach, link analysis shows the relationships and connections between individual entities within a linked group or network.

However, conventional link analysis approaches present several disadvantages. A third party network, i.e., one defined by a group of customers connected through C2C business activities, typically has at least two types of network properties. One is an internal property describing interactions and connections between member customers in a network. Link analysis is an adequate technique for analyzing and understanding the internal property of a link network. Another type of network property is an external property describing interactions and connections between a network (as a group object just like an individual customer) and other external entities such as a banking business provider. Under the existing link analysis techniques, external properties or characteristics of a link network are not apparent. Thus, the prior art presents no reliable way to understand and solve third party business problems, such as money laundering, thus allowing group patterns to become evident.

To understand the external property of a link network in solution space, it is desirable to extend link analysis to third-party or customer-to-customer network analysis in which business transactions between individual customers within a network and the business provider may be treated as transactions between a network object and the business provider. For example, financial transactions between individual members of a money laundering network and a bank should be treated as transactions between the network and the bank.

SUMMARY OF THE INVENTION

The present invention is directed to the solution of one or more of the problems described above. In a preferred embodiment, a method of analyzing characteristics or behaviors of customers engaged in customer-to-customer transactions in a third party network includes the steps of: (i) transforming data representative of a plurality of individual customer-to-customer transactions from a data representation to a network representation, and (ii) performing third-party network analysis on the network representation. Optionally and preferably, the method also includes the step of building one or more third-party networks corresponding to customer-to-customer transactions. Each third-party network preferably represents a group of customers connected through customer-to-customer transactions and comprises a plurality of nodes and a plurality of links, such that each node is associated with at least one link and each link is associated with at least two nodes. Each node preferably represents a member, customer or individual involved in third-party business activity, while each link preferably represents a connection or transaction between two member customers.

Optionally and preferably, each network has internal link pattern characteristics corresponding to interactions and connections between member customers in the network. Alternately or additionally, each network preferably has external network pattern characteristics, representing interactions and relationships between a network and external entities outside the network.

Optionally and preferably, the performance of third party analysis includes the performance of network mining using one or more mining algorithms. For example, the network mining may include decision tree mining that stores third-party network patterns in nodes, and at least one of the nodes may store a subset of networks having similar group pattern behaviors. Alternatively or in addition, the network mining may include using association rule mining to find networks having important association relationships with external patterns outside networks. Further, the network mining step may include using clustering group networks having similar network properties, and it may detect transactions that correspond, or that deviate from, a pattern.

In an alternate embodiment of the invention, a method of monitoring customer behavior includes the steps of: (i) monitoring data that corresponds to a plurality of individual transactions between customers; (ii) transforming the data corresponding to a group of the transactions into a network representation; and (iii) analyzing the network representation of the group of transactions to identify at least one transaction pattern. Optionally and preferably, the transforming step includes the step of building a network comprising a plurality of links and a plurality of nodes, where each node corresponds to a customer in a customer-to-customer transaction and each link corresponds to a transaction between two of the customer.

In an alternate embodiment of the invention, a method of monitoring activity in a network, includes the steps of: (i) monitoring a plurality of transactions that occur at least partially in a second network; (ii) storing a plurality of nodes in a computer program memory, wherein each node comprises data indicative of a participant in one or more of the transactions; and (ii) storing a plurality of links in the memory, wherein each link is associated with two nodes and each link includes data indicative of a measurement associated with the transaction between the participants associated with the same two nodes. Preferably, each transaction comprises a transaction between two parties and comprises a transfer of funds. Also preferably, the data indicative of a measurement comprises a customer ID or an account ID, a measure of transaction value, a measure of funds, a measure of time, a measure of distance between the participants associated with the nodes, or a measure of transaction frequency.

In this embodiment the method preferably also includes the step of analyzing the links to identify at least one group transaction pattern. It may also include the step of detecting a link that corresponds to or deviates from the at least one group transaction pattern. It may also include the additional steps of analyzing the links to identify at least one intra-network group transaction pattern, and analyzing the links to identify at least one extra-network group transaction pattern.

There have thus been outlined the more important features of the invention in order that the detailed description that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

The present invention provides a method and system for the analysis of group properties or group characteristics of Customers connected through third-party or customer-to-customer transactions. In particular, the invention relates to a network representation wherein groups of data values describing customer-to-customer business transactions are transformed into third-party networks. Through this invention, banks, financial service providers, regulators and others can better analyze group behaviors of such networks. Thus, they may gain a better understanding of group characteristics or group properties of the third-party network patterns though the analysis of customer-to-customer transactions or third party business activities, thus allowing those using the method to understand and recognize normal patterns, as well as to quickly identify potential problems because of known problem patterns or deviations from expected patterns.

A primary feature of a preferred embodiment of the invention is the transformation of C2C business activities from a data representation, where they appear as individual activities between customers, to a third-party network representation where they appear as group activities in a third-party network. Group behaviors become more evident, and therefore are more conveniently analyzed in a third-party network representation since each group of customers connected through C2C activities becomes a single object in the network representation. The new network representation forms a third-party network platform.

Figure 1:
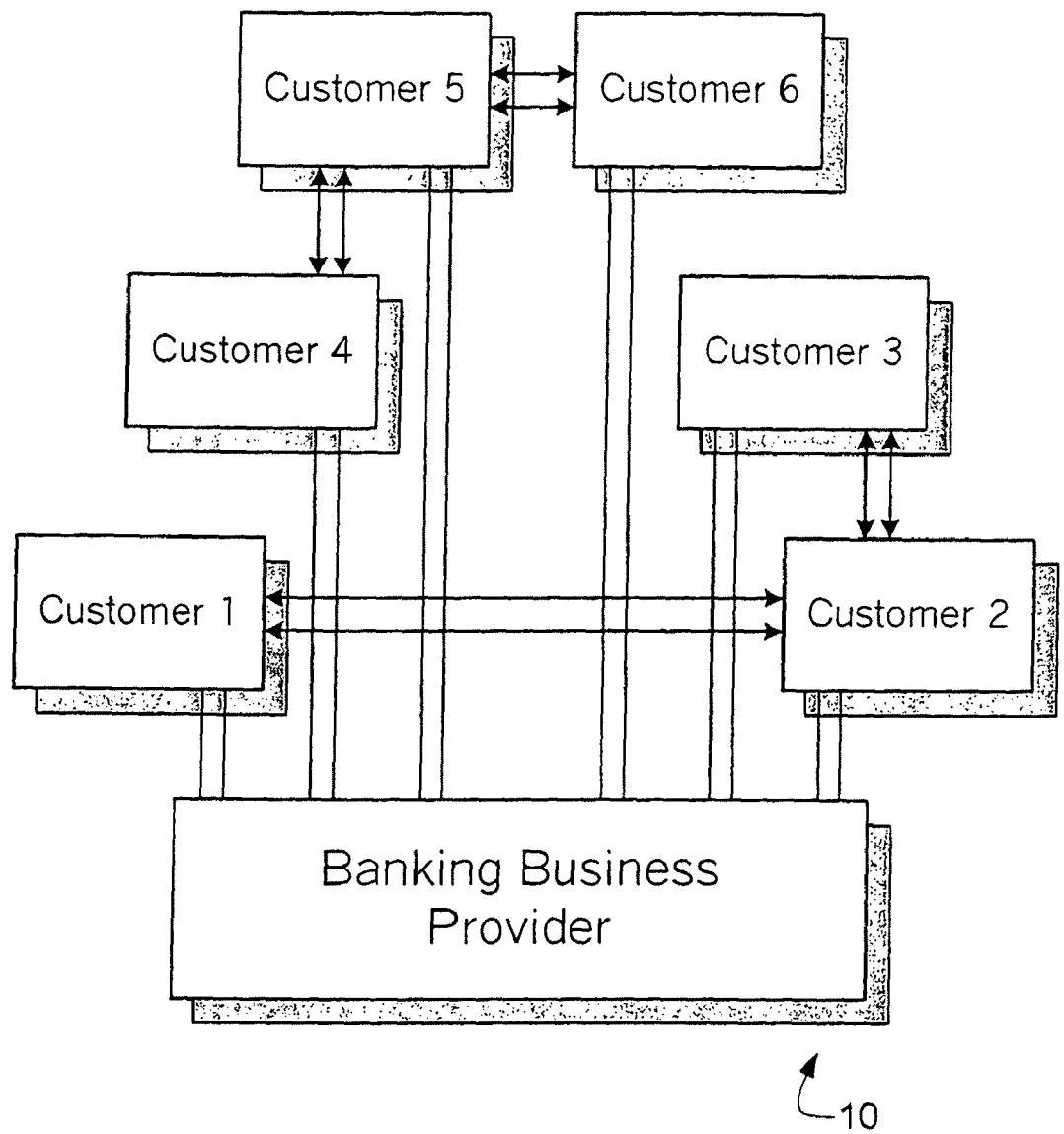
FIG. 1 illustrates representative business transactions, including C2C transactions (arrowed lines), in a data representation.
Figure 2:
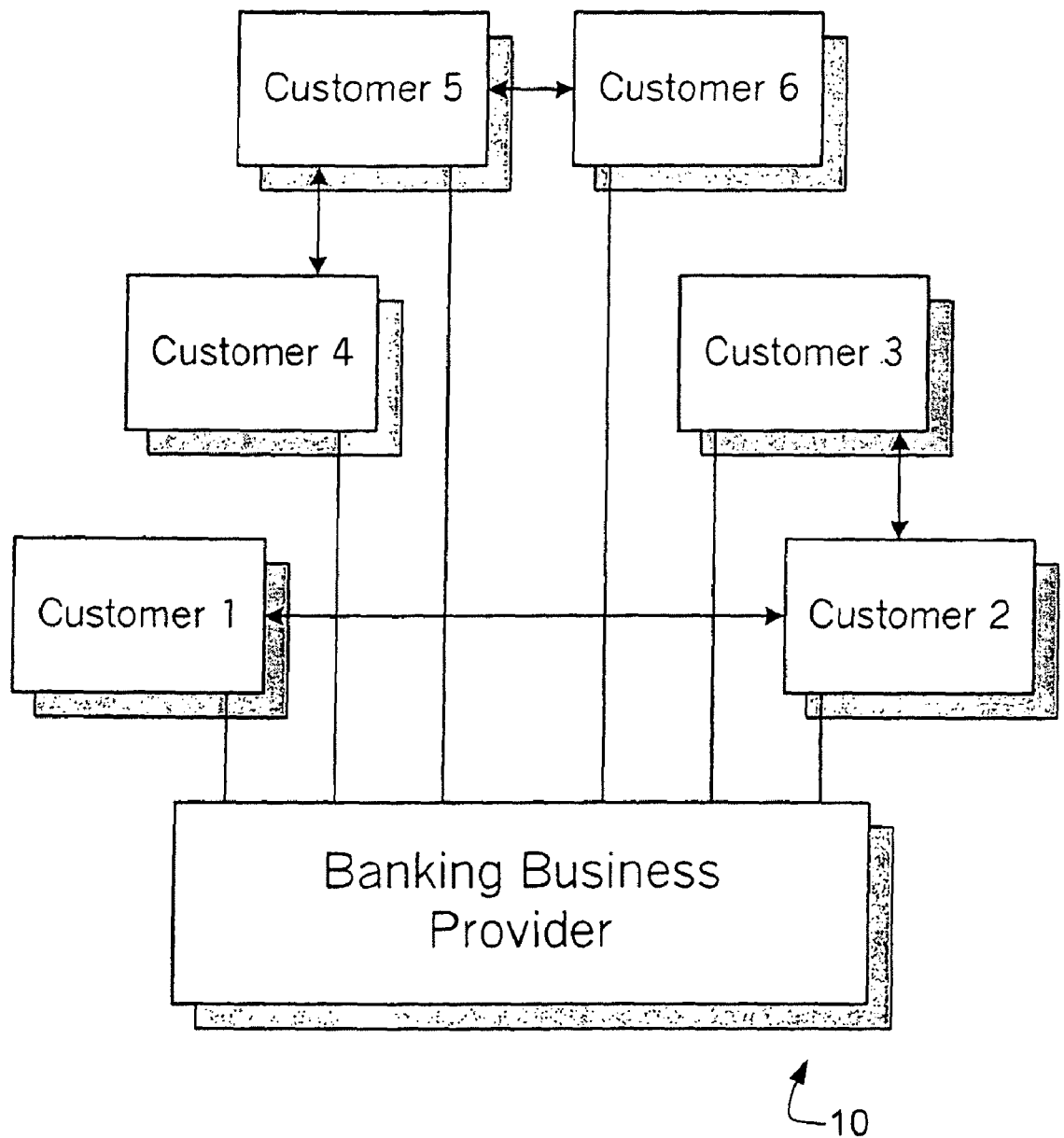
FIG. 2 illustrates representative business transactions, including C2C transactions (arrowed lines), in a pattern (individual pattern) representation.

FIGS. 1-4 illustrate the concept associated with a data representation, as compared to a network representation, and various intermediate representations. Referring to FIG. 1, financial transactions are illustrated in a data representation. Specifically, each transaction between banking business provider 10 and customers 1 through 6 is identified by a unique link. In addition, each transaction between any customer and another customer is identified by a unique link. Customer-to-customer transactions are illustrated in FIG. 1 by lines having arrows at each end, while customer to business provider transactions are illustrated by lines that contain no arrows. FIG. 2 illustrates a pattern representation of the transactions. Rather than identifying each individual transaction as a unique link, FIG. 2 illustrates only one link between business provider 10 and individual customers, or between individual customers, regardless of the number of actual transactions that occur.

Figure 3:
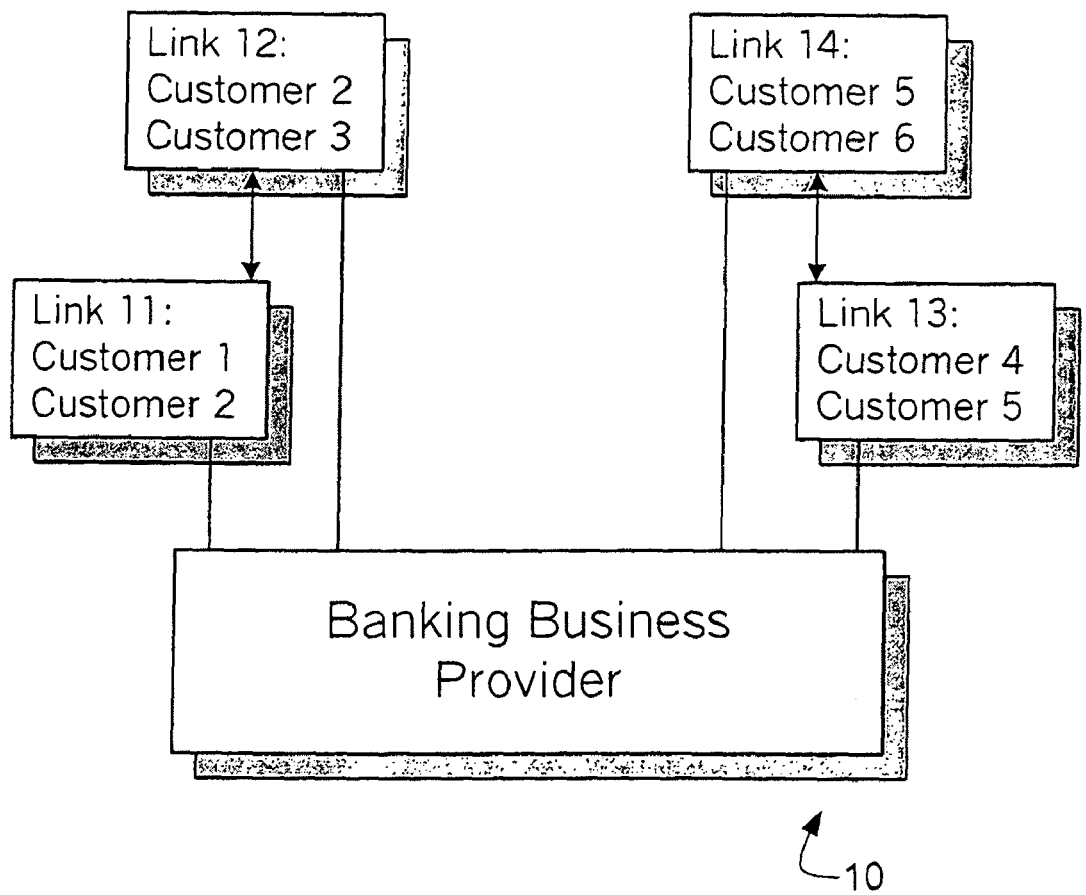
FIG. 3 illustrates representative business transactions, including C2C transactions (arrowed lines), in a link pattern (group pattern) representation.
Figure 4:
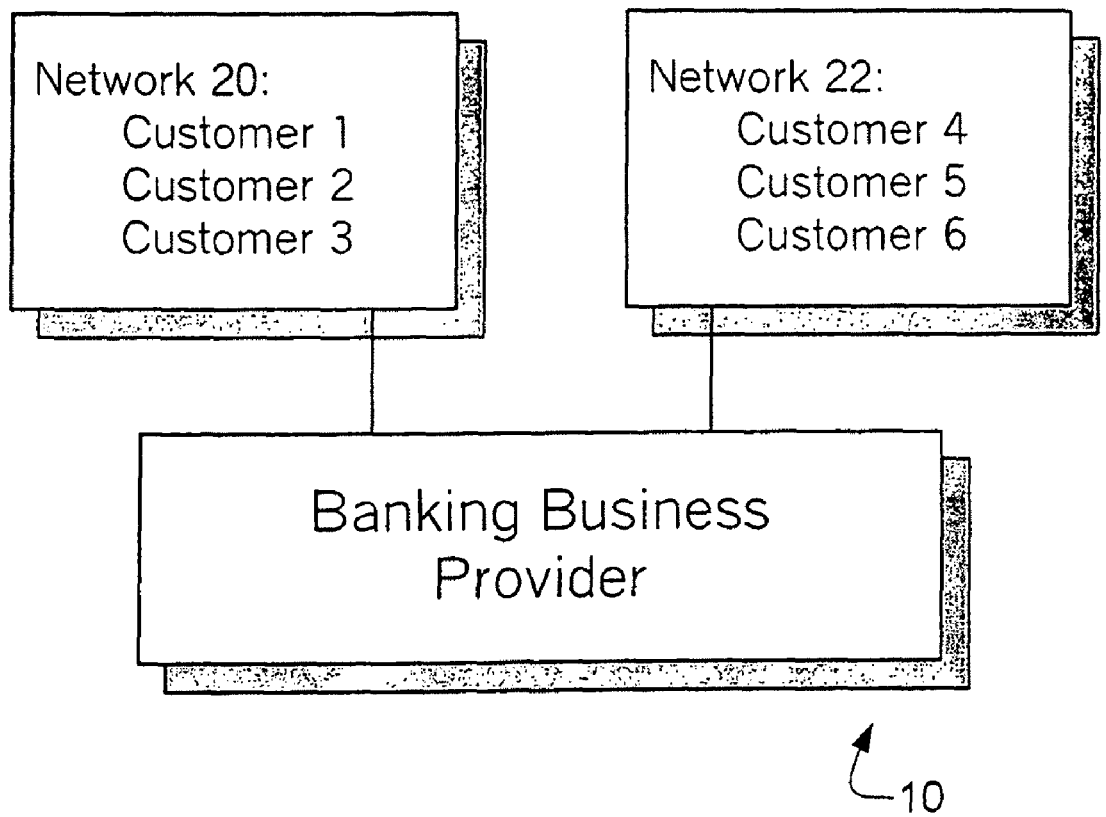
FIG. 4 illustrates representative business transactions in a network pattern (group pattern) representation.

In FIG. 3, the transactions are transformed into a link pattern representation. Rather than illustrating each individual customer, customers are combined depending on their transaction patterns. For example, in FIG. 2, customers 5 and 6 each engaged in transactions with business provider 10 and they also engaged in customer-to-customer transactions with each other. This unique pattern is illustrated in FIG. 3 by link 14, while link 13 is used to show that customer 4 may participate in an intermediate transaction between business provider 10 and customer 5. FIG. 4 illustrates the networks that have developed, based on the separation of groups that began to be illustrated in FIG. 3. As noted above, customers 5 and 6 in FIG. 3 include a common pattern and are linked to business provider 10 by link 14, while customer 5, along with customer 4, also contain a common pattern and are linked to business provider 10 by link 14. FIG. 3 illustrates customers 4, 5 and 6 as being combined into a third-party network 22 as the three customers are all linked to each other by customer-to-customer transactions and/or transactions with business provider 10.

A third-party network platform includes two major parts: network transform and network analysis. The third-party network transform portion of the platform builds a network platform by transforming C2C business activities from a data representation into a third-party network representation. The third-party network analysis portion of the platform performs network queries for analyzing group behaviors and properties in a standardized manner, in addition to behaviors and properties of individual customers. A standardized approach for performing network analysis in a network platform is to build a network query language and a network query engine. Since link network analysis is a part of the third-party network analysis, link query language becomes a part of network query language.

A third-party network object in a network representation has an internal network structure representing interactions and connections between member customers within a network. The internal structure is described by a link pattern through description of link pattern properties. In addition, a third-party network object has external properties describing its interactions with an external entity such as a bank. Analysis of both internal link pattern properties and external network pattern properties provides opportunities for better understanding of a network object representing a third party business network in financial industries.

A preferred embodiment of the present invention provides a method for the transformation of representations of C2C business activities from a data representation to a third-party network representation and for analyzing and mining internal link properties and external network properties. The preferred method converts a group of customers and C2C activities connecting the customers into a third-party network consisting of nodes and links. Each node in a third-party network represents a member customer and each link describes a unique C2C business activity or transaction between two member customers.

An example table showing illustrative data representing customer-to-customer transactions. The first two columns represent customer IDs. The third column shows the amounts of money being transferred (brackets represent a transfer in the opposite direction). The last column shows the frequency.

| Customer 1 | Customer 4 | $800,000 | 5 |
| Customer 2 | Customer 6 | $150,000 | 2 |
| Customer 3 | Customer 5 | ($20,000) | 2 |
| Customer 4 | Customer 8 | $1,000,000 | 5 |
| Customer 5 | Customer 7 | $35,000 | 3 |
| Customer 6 | Customer 9 | $100,000 | 4 |

-continued

| Customer 5 | Customer 10 | $10,000 | 1 |
| Customer 1 | Customer 8 | $1,500,000 | 8 |

Surprisingly and advantageously, we have found that the methods described herein for the transformation of representations of C2C business activities from a data representation to a network representation provides opportunities for better understanding of group pattern properties by analysis of at least two types of group pattern properties: internal link pattern property and external network pattern property.

In describing the invention in detail, the following general definitions will apply to the following terms when used herein. Of course, many terms are capable of having different but equivalent definitions. Equivalent definitions are also intended to fall within the scope of the present invention:

A node represents a member customer involved in a given C2C business activity in a third-party network, or a processing or communications device associated with such a customer.

A link represents a unique C2C business activity or transaction connecting to two member nodes in a third-party network and describes the relationships between the two member nodes.

A third-party network represents a group of customers connected through C2C business activities, or a communications network on which such customers perform such activities.

A dictionary represents a set of unique values of nodes, links, or networks.

A measure is a metric measuring nodes, links, or networks.

A frequency measure is a measure of the number of occurrences for a node, link, of network.

A non-frequency measure is a measure of something other than frequency, and preferably of money, time, and/or distance related to a node, link, or network.

A token is an index or key associated with a dictionary value of a node or link.

Network Transform

In order to simplify the transformation of groups of customers connected through C2C activities from a data representation to a network representation, it is preferable to preprocess original data to have a simple format suitable for the network transform before performing a network transform. First, one may separate C2C data from other data, especially if the other data includes data describing transactions between customers and the business provider. Then, all C2C data may be stored in a standard format, such as a tabular format in which each unique C2C activity or transaction is stored in one row. Each such row would contain a pair of customers involved in a given C2C activity and measure of the C2C activity such as frequency counts of occurrences of the activity or the amounts of money involved in the activity. For example, a fund transfer between customers is a C2C activity in which two customers are involved and a measure of the transfer can be the amount of money transferred or the number of transactions taking place between the two customers. Thus, the standard, and thus a preferred, format for a two-customer activity is customer A (from), customer B (to), and a measure of the transaction or connection between the two customers connected through C2C transactions. The measure can be a frequency measure, such as a count of the transaction occurrences, or it may be a non-frequency measure, such as one of money amounts, involved in a C2C activity. All binary C2C activities should preferably have this format before transformation occurs.

The network transform is intended to convert unstructured C2C business activities in a data representation to structured group objects in a network representation. In order to make the transform scalable, one may perform an incremental transform of C2C data from a data representation to a network representation. In an incremental model, a fraction of a large amount of data is transformed at a time. The results are merged with those of the previous increment. These incrementally transformed results grow in size. The merge allows partial transform completed at any point of increment even when the transform is interrupted due to a crash. The interrupted transform may be resumed at the point where it is interrupted.

Figure 5:
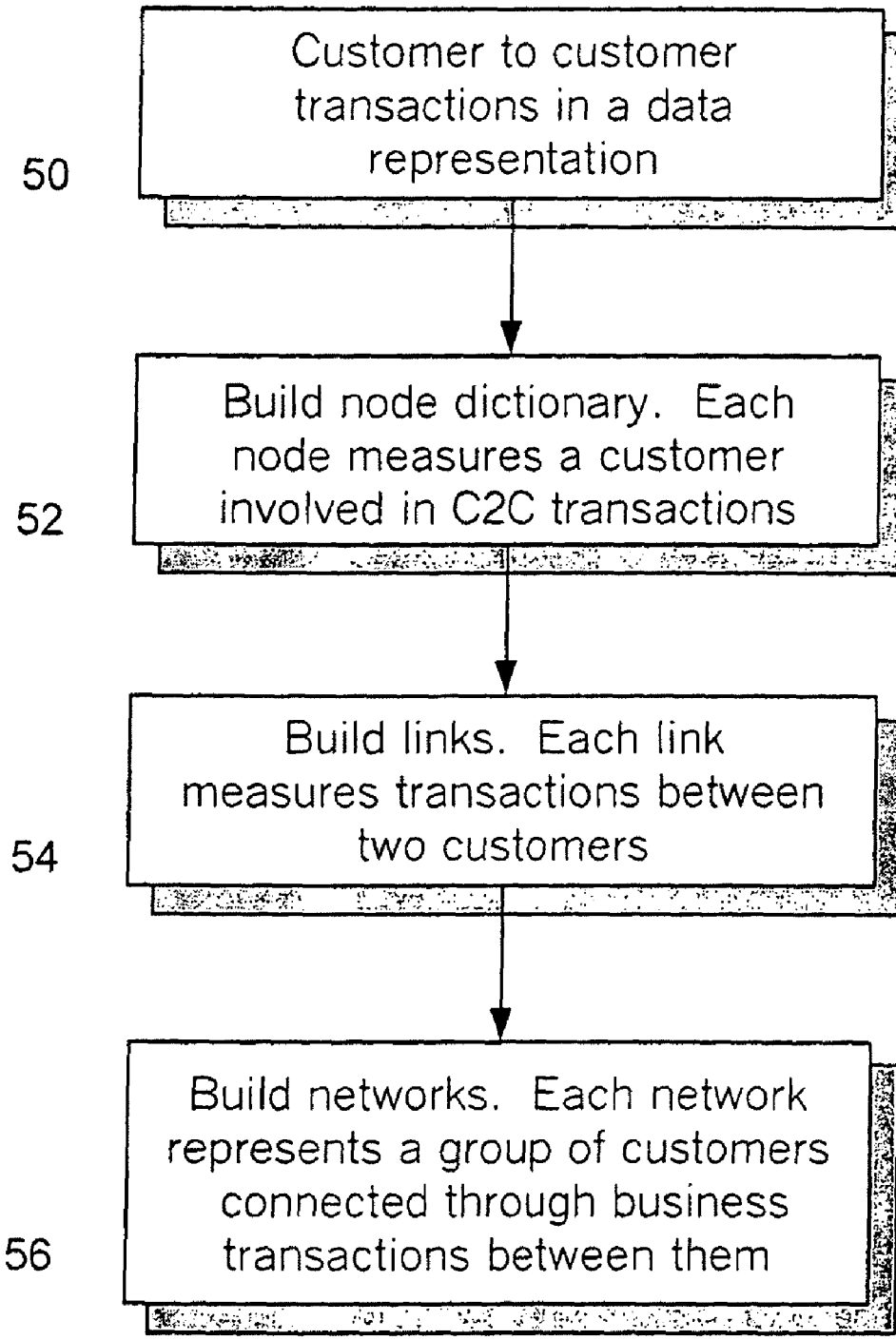
FIG. 5 is a flow chart showing steps that may be followed in accordance with a first part of a preferred embodiment of this invention, namely, the transformation of transaction representations from a data platform to a network platform.

FIG. 5 illustrates a preferred embodiment of the transformation methods described herein. Referring to FIG. 5, the first step for the transform is to select preprocessed C2C data (step 50). This is preferably carried out by performing an SQL query with a group-by clause. Selection of C2C data is preferably performed incrementally. Each increment comes from a range of data in a relational table. The query results are preferably unique pairs of customers or accounts and the corresponding measure of links connecting pairs of customers.

After selection of data, one may build a dictionary for nodes (step 52). Each dictionary value is a definition for a node. For example, it can be a customer ID, an account ID, or optionally some other value. Node tokens are used to replace original node values in the selected data for building links and networks more efficiently later on. The node dictionary should be stored. Node measure, frequency or non-frequency measure, may be stored. Frequency counts of occurrences of nodes may be obtained and stored as a frequency measure of nodes. This is an option because the node counts can be obtained from a measure of links that should be stored. Similarly, a non-frequency measure, such as the amount of money associated with nodes, may be obtained and stored as a non-frequency measure of nodes. This is also an option. Other non-frequency measures include: time measure—the amounts of time spent by nodes (e.g., telephone business); measures of distance—total distances associated with nodes (e.g., distance between a provider and his/her customers in medical business, distance between suspects in criminal business or in fraud business). Tokens are used to represent values of nodes, links, and networks in order to make performance more efficient. An example of a node dictionary is shown below:

| Customer 1 | $2,300,000 | 13 |
| Customer 2 | $150,000 | 2 |
| Customer 3 | $20,000 | 2 |
| Customer 4 | $1,000,000 | 5 |
| Customer 5 | $65,000 | 6 |
| Customer 6 | $250,000 | 6 |
| Customer 7 | $35,000 | 3 |
| Customer 8 | $1,000,000 | 5 |
| Customer 9 | $100,000 | 4 |
| Customer 10 | $10,000 | 1 |

In the table listed above, the first column shows node values, in this case customer IDs. The second column shows the amounts of money for each node. The last column shows node frequency In step 54, after replacing raw data values of nodes by node tokens, link values that are pairs of node values are expressed as pairs of tokens. A dictionary for links or pairs of tokens is built and stored. An example of such a link dictionary, with values, is illustrated below:

| 1 | 4 | $800,000 | 5 |
| 2 | 6 | $150,000 | 2 |
| 3 | 5 | ($20,000) | 2 |
| 4 | 8 | $1,000,000 | 5 |
| 5 | 7 | $35,000 | 3 |
| 6 | 9 | $100,000 | 4 |
| 5 | 10 | $10,000 | 1 |
| 1 | 8 | $1,500,000 | 8 |

In the table above, the first two columns show link values, or pairs of node tokens. The third column shows the amounts of money for each link with direction (brackets for opposite direction). The last column shows link frequency.

Preferably, as shown above, a measure of links is also stored. Frequency counts of occurrences of links are obtained and stored as a frequency measure of links. Non-frequency measures may be also obtained and stored if needed.

The final step illustrated in FIG. 5 (step 56) is to build networks in the new network representation. This is a process of obtaining networks from links. A dictionary for networks is built and stored. Each dictionary value represents a set of links connected through C2C activities. An example of such a network dictionary, with exemplary values, with each row representing a network, is illustrated below:

| 1, 4 | 1, 8 | 4, 8 |
| 2, 6 | 6, 9 | |
| 3, 5 | 5, 7 | 5, 10 |

As an option, one may obtain and store frequency and non-frequency measures of networks. Unlike node and link measures, there is no single definition for frequency measure of networks since links within a network may have different frequency counts. Choices of mean, sum, minimum, maximum, or average deviation may be made. Similar choices for non-frequency measures of networks may be made also.

Third-Party Network Analysis

A primary function of third-party network analysis is to study and understand network properties including both internal properties and external properties. The internal properties reflect the characteristics and properties of C2C transactions within each network, and may be analyzed using conventional techniques for link analysis. The external properties represent all other transactions than C2C transactions, such as transactions between customers and the business provider—a bank in banking business or a brokerage firm in brokerage industry. These properties are analyzed using a network approach. The main difference between a third-party network analysis and other pattern analyses is to treat a network of customers connected through third-party activities as a single customer-like network object, instead of treating each individual customer as an object. All the techniques developed for analysis and data mining of individual patterns may be used for third-party network analysis and third-party network mining by replacing individual objects by network objects.

Figure 6:
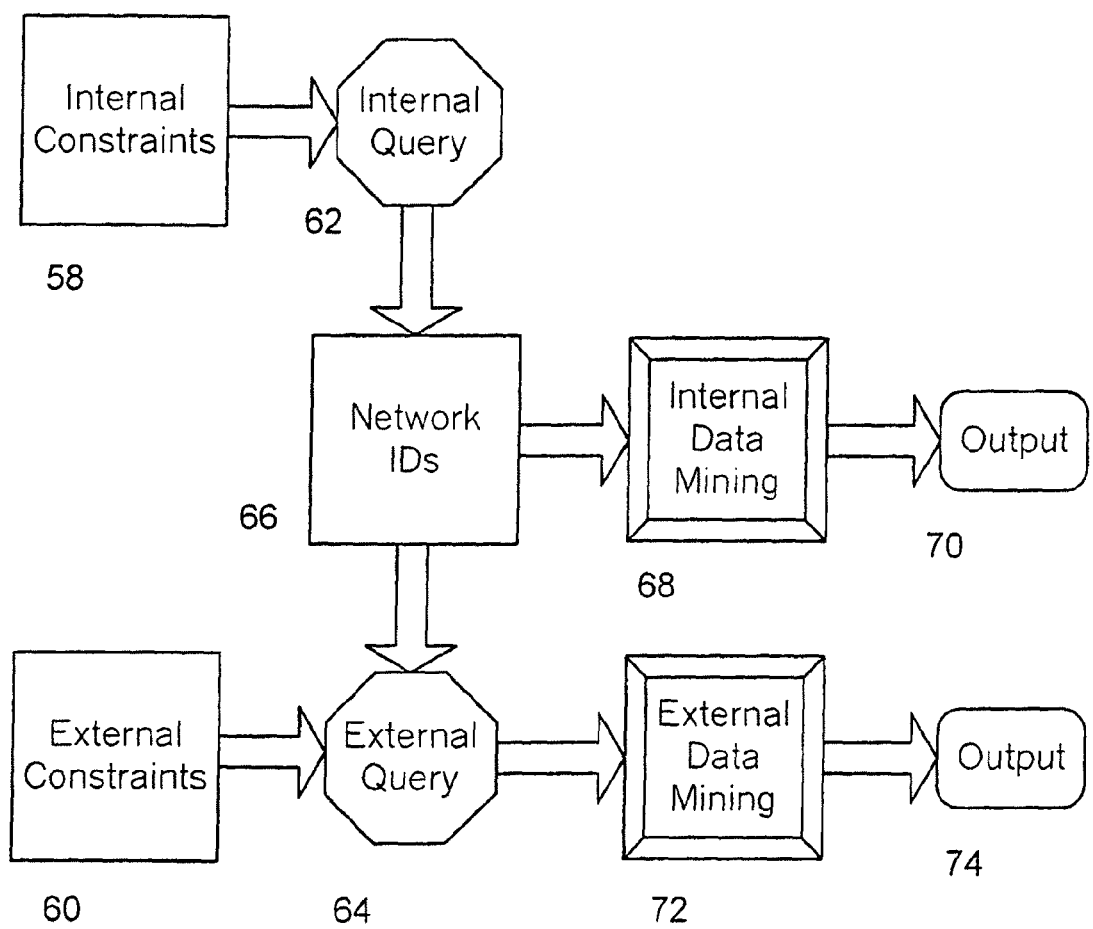
FIG. 6 is a flow chart showing steps that may be followed in accordance with a second part of a preferred embodiment of this invention, namely, the analysis of group behaviors in a network platform.

One important element for performing network analysis in a third-party network platform is to have a network query language. The network query language is intended to provide the functionality of performing C2C network queries either in a network platform or in a hybrid platform consisting of a network platform and a data platform. Also, it provides query capability difficult to perform for data query languages such as SQL. A SQL-like network language would be more attractive to the relational database users. A typical process for network analysis is shown in FIG. 6. For analysis of the internal characteristics of networks, a query engine may select networks satisfying the internal constraints 58 shown in FIG. 6 and perform data mining (step 68) on the characteristics of the network internal structures. Similarly, the query engine may select networks satisfying external constraints 60 and perform data mining (step 72) on the external characteristics of the networks for analysis of external properties of networks.

In general, there are two types of results from third-party network analysis, coming out from internal 68 and external 72 data mining as shown in FIG. 6. One describes internal properties of networks, namely results from link analysis of connections and relationships between member customers within a network. The other describes external properties of networks representing interactions between a customer network and a business provider such as a bank, as if each network appeared like an individual customer. Similarly, there are two types of network constraints: internal constraints and external constraints, as shown in FIG. 6.

Figure 7:
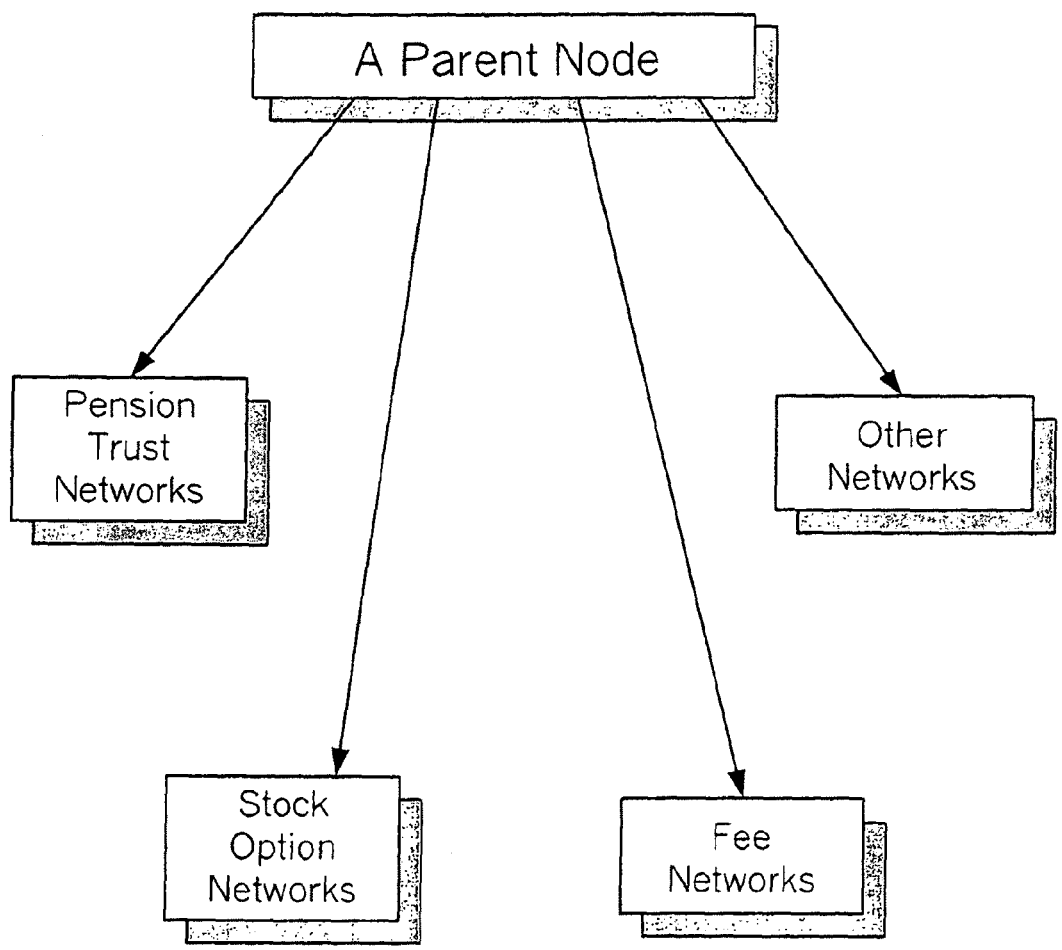
FIG. 7 illustrates a sub-tree structure storing networks of different characteristics at various nodes.

Third-party network analysis may be performed using conventional data mining algorithms developed for mining individual patterns, such as association rules, clustering, neural networks, and decision tree. The main difference is that these algorithms are used to mine network patterns or group patterns in third-party network analysis, instead of individual patterns. For example, a decision tree may be built to classify and store third-party network patterns in various nodes. Each node stores network patterns having different pattern properties from network patterns in each other node, as illustrated in FIG. 7. Also, association rules may be used to measure and mine relationships between a network and external entities.

Examples of network properties of third-party networks are given as follows. In brokerage industry, a brokerage firm has a number of customers. The main business activities are financial transactions between the firm and its customers. However, some customers have financial transactions between themselves. A C2C network represents a group of customers connected through C2C transactions. A typical network is a pension trust network in which a number of pension trust accounts are connected through transactions regularly between a central account and the rest in the network. In this case, C2C pension trust business is conducted through a pension trust network. Another typical network is a stock option network in which a number of individual accounts and a company account are set up for C2C transactions. Customers of the individual accounts are employees of the company. C2C transactions between individual accounts and the company account represent activities related to the company's stock options. Another typical network is a fee network in which C2C transactions represent fee payments between member customers in a fee network.

All of the above examples show typical third party businesses that are legal. However, there are C2C networks in which third party transactions are illegal. For example, a money-laundering network represents a group of customers transferring funds between them. The source of these funds comes from illegal activities. Link analysis of C2C transactions in a money-laundering network may not be sufficient for identification of the money-laundering problem. Third-party network analysis of such networks provides additional opportunity for more complete understanding of the problem. The characteristics of the networks in the above examples may be described by various nodes in a sub-tree structure as shown in FIG. 7.

External Properties

To demonstrate external properties of networks, we use the example shown earlier may be used to illustrate a network transform. Consider the method performing a network query to show account registration types for customers in each network. The query may find, for example, that all customers in the first network have account registration type of PT, meaning in this example pension trust. The other two networks have a similar pattern in registration types. One customer in each network has account registration type of CORP, meaning in this example company. The other customers in each network have account registration type of IN, meaning in this example individual. It turns out that the first network is a pension-trust network consisting of three pension-trust accounts managed by a company. The company manages pension-trust investment for three clients. Each account is set up for one of its clients. Financial transactions between the three accounts represent allocations of diversified investment. Perform a network query to show account segment type for the remaining networks. All customers in the second network have a type of employee stock option action (ESOS) for stock option type. This network turns out to be a stock-option network. Typically, a company may set up an account for the company and a few accounts for its key employees having stock options. Transactions between the company account and the employees' accounts reflect stock option exercises by the employees. In the example, further study of the third network shows a pattern: one account (CORP) in the network receives funds from overseas and distributes the funds to the other three accounts. One scenario for such pattern could be a money laundering network.

Exemplary Apparatus

Certain portions of the invention may be performed by an automated processing system. Viewed externally in FIG. 8, an exemplary computer system designated by reference numeral 101 has a central processing unit located within a housing 108 and disk drives 103 and 104. Disk drives 103 and 104 are merely symbolic of a number of disk drives which might be accommodated by the computer system. Typically these would include a hard disk drive and optionally one or more floppy disk drives such as 103 and/or one or more CD-ROMs, CD-Rs, CD-RWs flash memory, memory stick or digital video disk (DVD) devices indicated by slot 104. The number and types of drives typically varies with different computer configurations. Disk drives 103 and 104 are in fact options, and they may be omitted from the computer system used in connection with the processes described herein. An exemplary type of storage media 110, which may serve as a carrier for program instructions, is also illustrated. Additionally, the computer system utilized for implementing the present invention may be a stand-alone computer having communications capability, a computer connected to a network or able to communicate via a network, a handheld computing device, or any other form of computing device capable of carrying out equivalent operations.

The computer also has or is connected to or delivers signals to a display 105 upon which graphical, video and/or alphanumeric information is displayed. The display may be any device capable of presenting visual images, such as a television screen, a computer monitor, a projection device, a handheld or other microelectronic device having video display capabilities, or even a device such as a headset or helmet worn by the user to present visual images to the user's eyes. The computer may also have or be connected to other means of obtaining signals to be processed. Such means of obtaining these signals may include any device capable of receiving images and image streams, such as video input and graphics cards, digital signal processing units, appropriately configured network connections, or any other microelectronic device having such input capabilities.

An optional keyboard 106 and a directing device 107 such as a remote control, mouse, joystick, touch pad, track ball, steering wheel, remote control or any other type of pointing or directing device may be provided as input devices to interface with the central processing unit.

Figure 8:
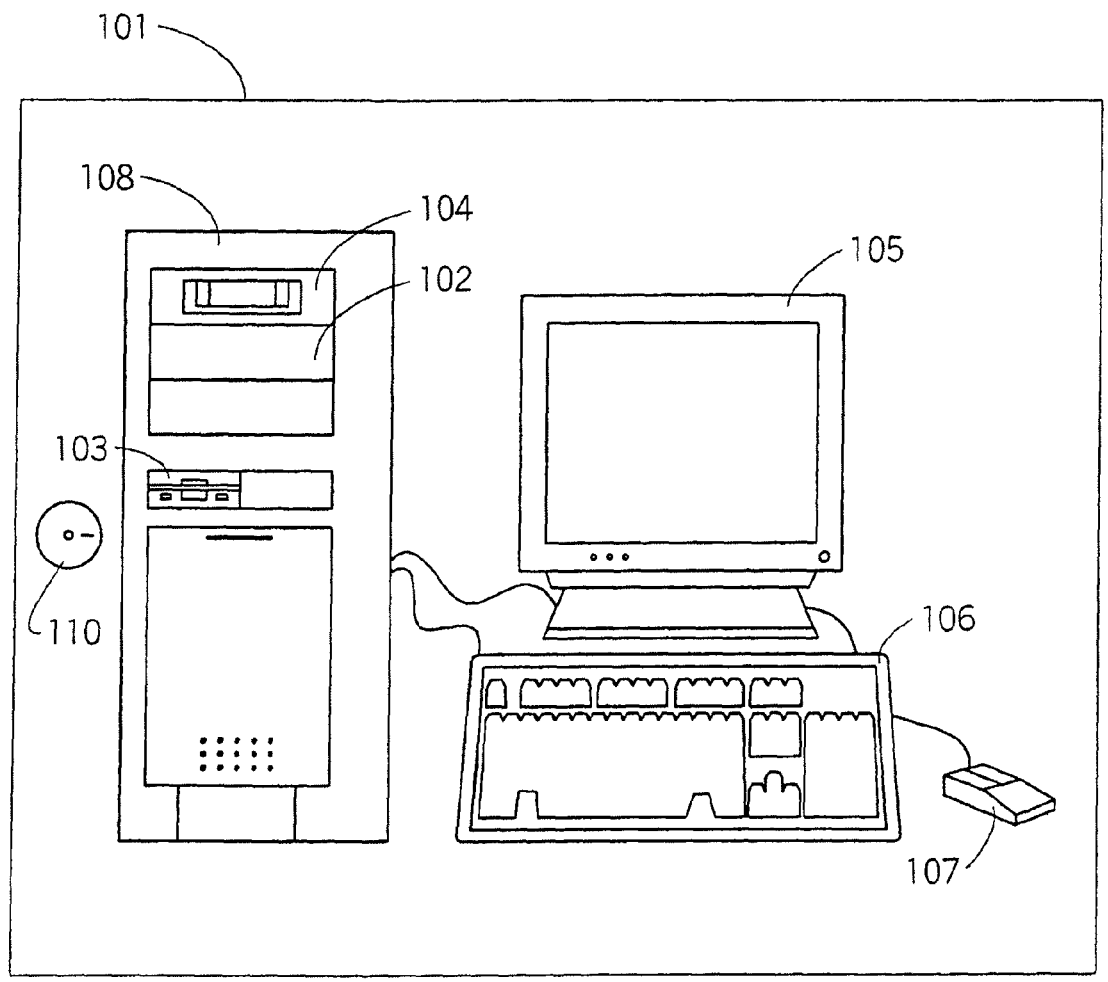
FIG. 8 shows a representative computer suitable for carrying out the methods of the present invention, along with an exemplary computer-readable carrier.
Figure 9:
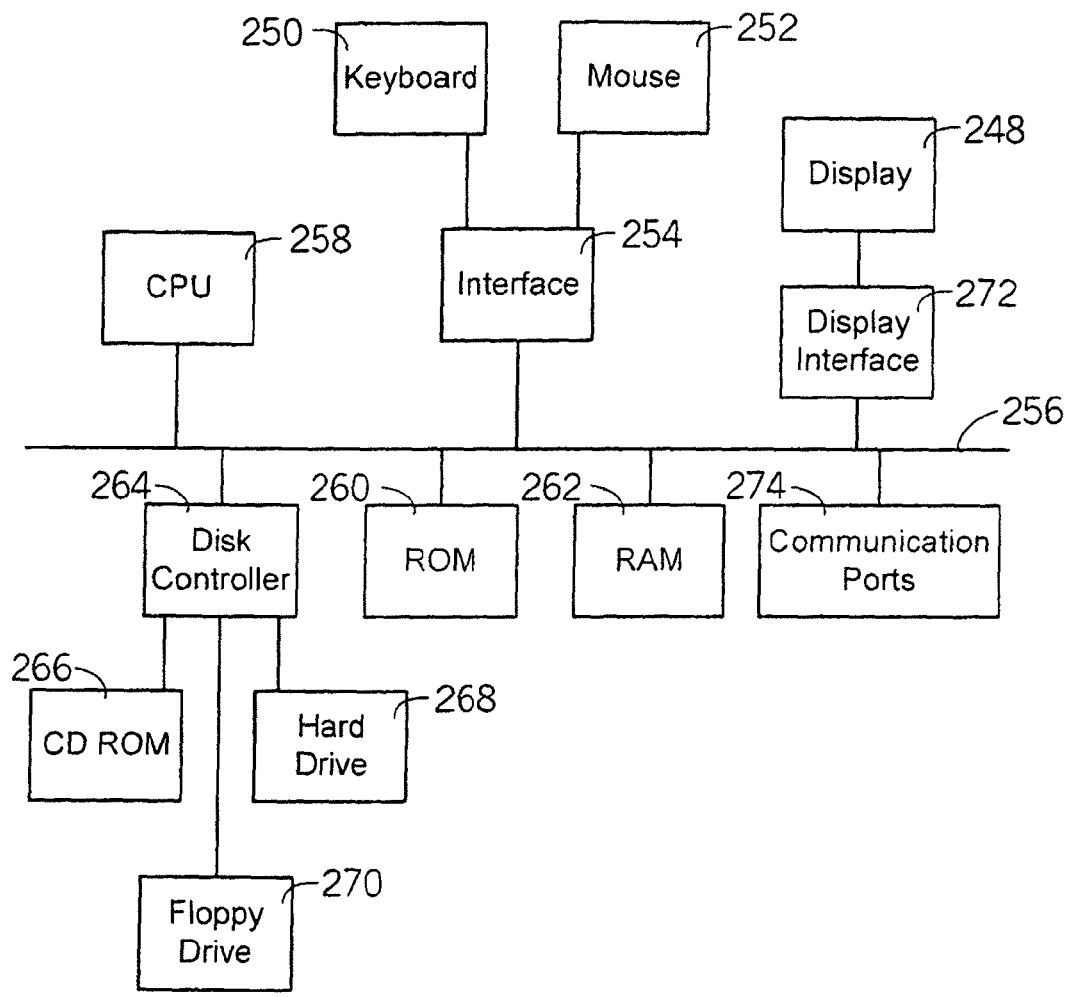
FIG. 9 illustrates several elements of a preferred embodiment of the computer illustrated in FIG. 8.

FIG. 9 illustrates a block diagram of the internal hardware of the computer of FIG. 8. A bus 256 serves as the main information highway interconnecting the other components of the computer. CPU 258 is the central processing unit of the system, performing calculations and logic operations required to execute a program. Read only memory (ROM) 260 and random access memory (RAM) 262 constitute the main memory of the computer.

A disk controller 264 interfaces one or more disk drives to the system bus 256. These disk drives may be external or internal floppy disk drives such as 270, external or internal CD-ROM, CD-R, CD-RW flash memory, memory stick or DVD drives such as 266, or external or internal hard drives 268 or other many devices. As indicated previously, these various disk drives and disk controllers are optional devices.

Program instructions may be stored in the ROM 260 and/or the RAM 262. Optionally, program instructions may be stored on a computer readable carrier such as a floppy disk or a digital disk or other recording medium, a communications signal, or a carrier wave.

Returning to FIG. 9, a display interface 272 permits information from the bus 256 to be displayed on the display 248 in audio, graphic or alphanumeric format. Communication with external devices may optionally occur using various communication ports such as 274.

In addition to the standard components of the computer, the computer also includes an interface 254 which allows for data input through the keyboard 250 or other input device and/or the directional or pointing device 252 such as a remote control, pointer, mouse or joystick Transformation Process The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

The invention claimed is:

1. A method of monitoring network activity, the method comprising:
monitoring a plurality of transactions that occur at least partially in a first network;
monitoring a plurality of transactions that occur at least partially in a second network;
storing, in a computer program memory, a plurality of node, each node comprising data indicative of a participant in a transaction of the plurality of transactions;
storing, in the computer program memory, a plurality of links, each link is associated with two nodes, and each link comprises data indicative of a measurement associated with the transaction between the participants associated with the same two nodes;
transforming the data indicative of a measurement associated with the transaction between the participants associated with the same two nodes from a data representation into a network representation; and
analyzing the network representation to identify at least one transaction pattern within the network representation.

2. The method of claim 1, wherein each transaction comprises a transaction between two parties.

3. The method of claim 1, wherein each transaction comprises a transfer of funds.

4. The method of claim 1, wherein the data indicative of a measurement comprises a Customer Identification (ID) and an account identification (ID).

5. The method of claim 1, wherein the data indicative of a measurement comprises a measure of transaction value, a measure of funds, a measure of time, a measure of distance between the participants associated with the nodes, or a measure of transaction frequency.

6. The method of claim 1, further comprising analyzing the links to identify at least one group transaction patterns.

7. The method of claim 6, further comprising detecting a link that deviates from the at least one group transaction patterns.

8. The method of claim 6, further comprising detecting a link that corresponds to a pre-identified transaction pattern.

9. The method of claim 1, further comprising:
analyzing the links to identify at least one intra-network group transaction pattern; and
analyzing the links to identify at least one extra-network group transaction pattern.

10. The method of claim 9, further comprising detecting a link that does not conform to any applicable group transaction pattern.

11. The method of claim 9, further comprising detecting a link that corresponds to a pre-identified transaction pattern.

12. A non-transitory computer-readable medium for monitoring network activity, having sets of instructions stored thereon which, when execute by a computer, cause the computer to:
monitor a plurality of transactions that occur at least partially in a first network;
monitor the plurality of transactions that occur at least partially in a second network;
store, in a computer program memory, a plurality of nodes, each node comprising data indicative of a participant in a transaction of the plurality of transactions;
store, in the computer program memory, a plurality of links, each link is associated with two nodes, and each link comprises data indicative of a measurement associated with the transaction between the participants associated with the same two nodes;
transform the data indicative of a measurement associated with the transaction between the participants associated with the same two nodes from a data representation into a network representation; and
analyze the network representation to identify at least one transaction pattern within the network representation.

13. The non-transitory computer-readable medium of claim 12, wherein each transaction comprises a transaction between two parties.

14. The non-transitory computer-readable medium of claim 12, wherein each transaction comprises a transfer of funds.

15. The computer-readable medium of claim 12, wherein the data indicative of a measurement comprises a Customer Identification (ID) or an account identification (ID).

16. The non-transitory computer-readable medium of claim 12, wherein the data indicative of a measurement comprises a measure of transaction value, a measure of funds, a measure of time, a measure of distance between the participants associated with the nodes, or a measure of transaction frequency.

17. A system for monitoring network activity, the system comprising:
   a storage device; and
   at least one processor in communication with the storage device, wherein the storage device has sets of instructions stored thereon which, when execute by the at least one processor, cause the at least one processor to:
      monitor a plurality of transactions that occur at least partially in a first network;
      monitor a plurality of transactions that occur at least partially in a second network;
      store, in a computer program memory, a plurality of nodes, each node comprising data indicative of a participant in a transaction of the plurality of transactions;
      store, in the computer program memory, a plurality of links, each link is associated with two nodes, and each link comprises data indicative of a measurement associated with the transaction between the participants associated with the same two nodes;
      transform the data indicative of a measurement associated with the transaction between the participants associated with the same two nodes from a data representation into a network representation; and
      analyze the network representation to identify at least one transaction pattern within the network representation.

18. The system of claim 17, wherein the sets of instructions when further executed by the at least one processor, cause the at least one processor to analyze the links to identify at least one group transaction patterns.

19. The system of claim 18, wherein the sets of instructions when further executed by the at least one processor, cause the at least one processor to detect a link that deviates from the at least one group transaction patterns.

20. The system of claim 18, wherein the sets of instructions when further executed by the at least one processor, cause the at least one processor to detect a link that corresponds to a pre-identified transaction pattern.

* * * * *